2,543,000

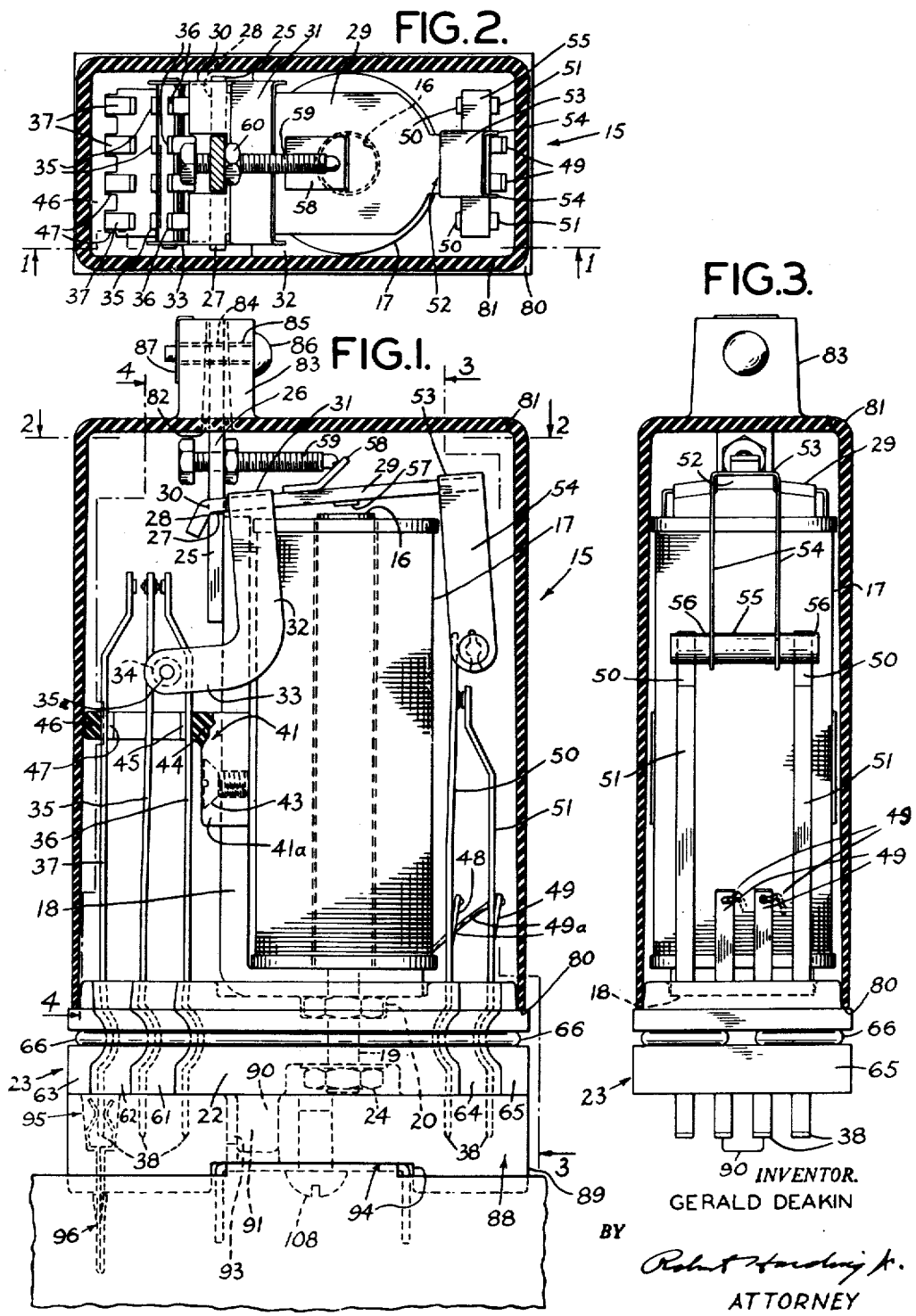
Feb. 27, 1951  G. DEAKIN  2,543,000
PLUG-IN RELAY
Filed March 12, 1946  3 Sheets-Sheet 1
INVENTOR.
GERALD DEAKIN
BY
ATTORNEY Feb. 27, 1951         G. DEAKIN         2,543,000
                    PLUG-IN RELAY
Filed March 12, 1946                    3 Sheets-Sheet 2
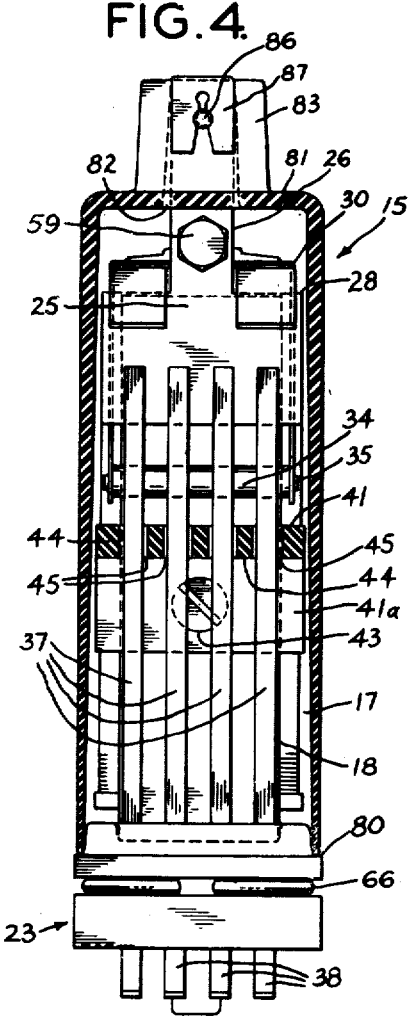
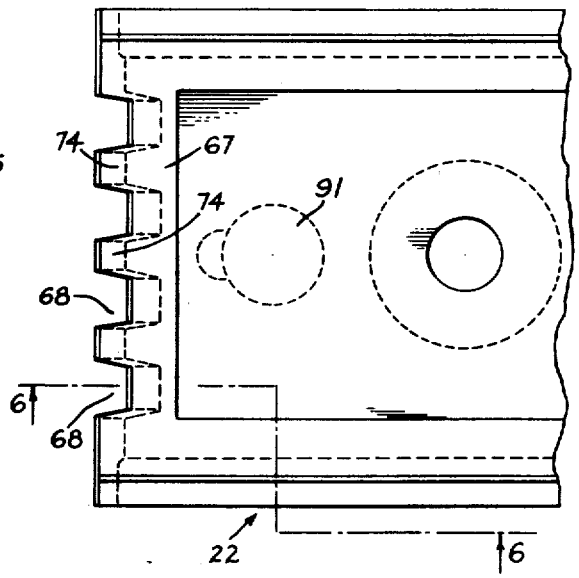
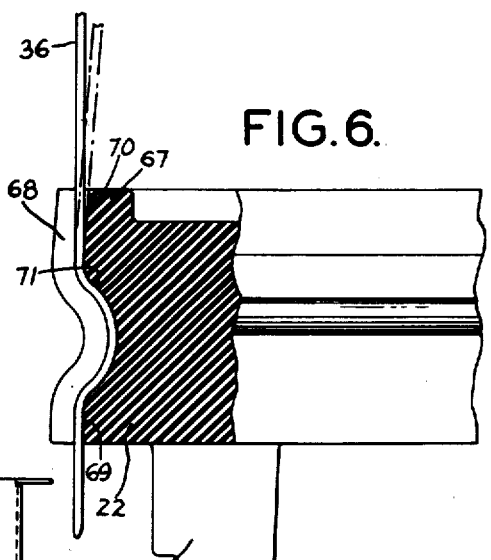
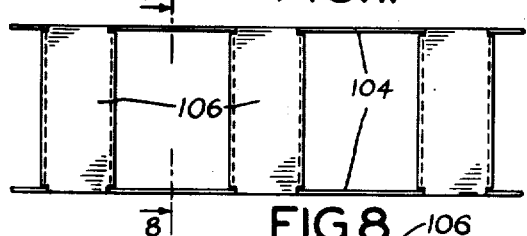
INVENTOR.
GERALD DEAKIN
BY
Robert F Harding Jr.
ATTORNEY Feb. 27, 1951 G. DEAKIN 2,543,000
PLUG-IN RELAY
Filed March 12, 1946 3 Sheets-Sheet 3
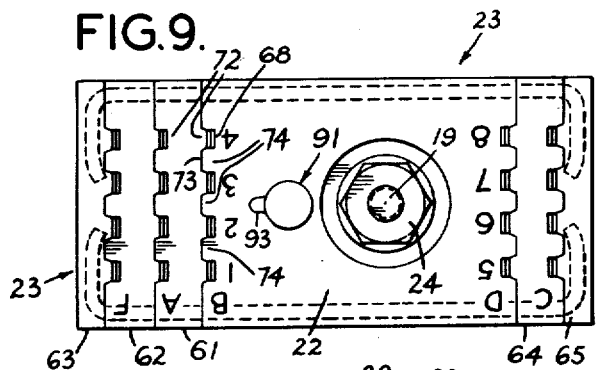
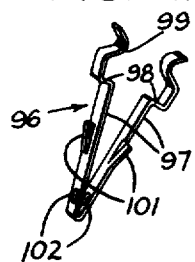
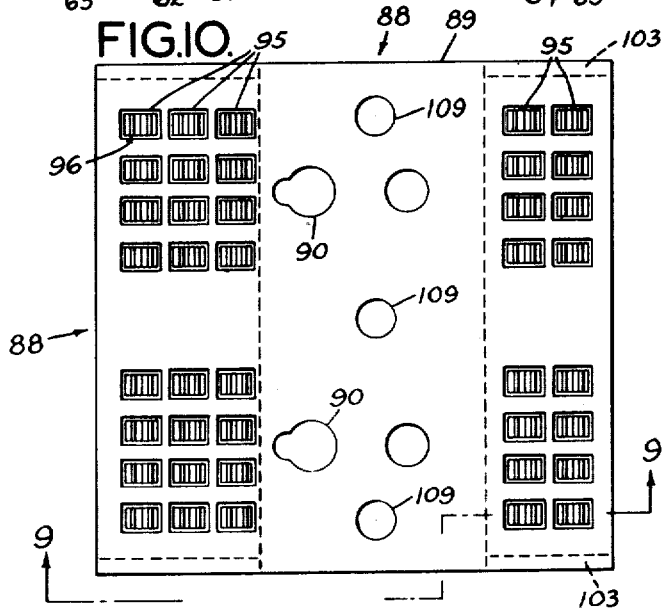
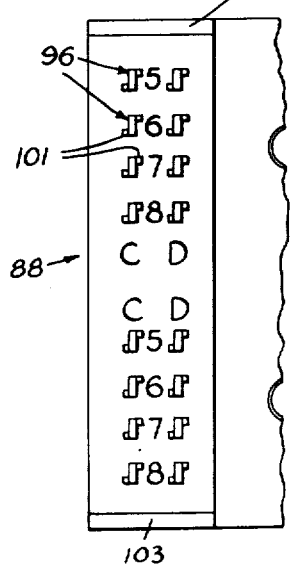
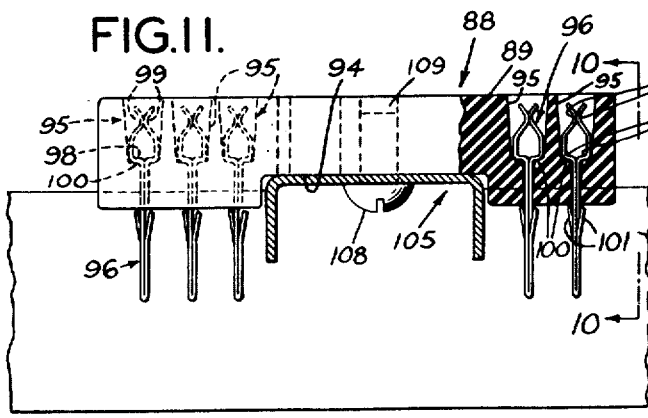
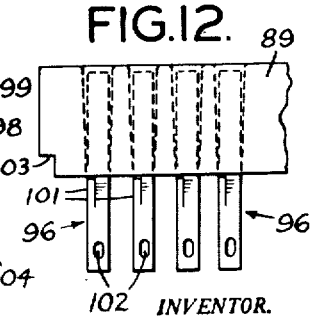
INVENTOR.
GERALD DEAKIN
BY
ATTORNEY Patented Feb. 27, 1951

UNITED STATES PATENT OFFICE 2,543,000

PLUG-IN RELAY

Gerald Deakin, New York, N. Y., assignor to International Standard Electric Corporation, New York, N. Y., a corporation of Delaware Application March 12, 1946, Serial No. 653,896

7 Claims. (Cl. 200—87)

The present invention relates to relays and connections therefor and an important object of the invention is to provide a novel and advantageous plug-in relay adapted for use in communication systems such as telephone systems.

Another object of the invention is to provide a novel and advantageous relay assembly.

Another object of the invention is to provide a novel and advantageous socket assembly for use with said plug-in relay.

Still another object of the invention is to provide novel and advantageous means for mounting said socket.

Yet another object of the invention is to provide novel and advantageous means for mounting said socket whereby the socket can be readily applied or removed.

A further object of the invention is to provide a plug-in relay wherein the ends of conductor springs including contact springs, serve as plug-in terminals.

A still further object of the invention is to provide a dust-tight multi-contact relay.

Another object of the invention is to cheapen manufacture by permitting the use of contact springs formed and cut from a continuous strip of suitable spring metal such as bronze without punching, drilling, trimming, or other machine operation. Waste of labor and material is thus eliminated.

A further object of the invention is to provide a relay having novel and advantageous dust-excluding means.

According to the present invention manufacture may be further cheapened by mounting the sockets with their easily accessible and clearly marked terminals on their mounting plates or frames and then wiring them without waiting for the relays, which may be plugged in at any time thereafter in the factory or on the job. At the present time it is necessary to delay wiring until the relays are finished and mounted. Wiring is difficult because of the awkward and unmarked arrangement of the present relay terminals. Plug in relays may be replaced easily, and defective relays may be examined on a bench rather than on the bay. In large circuits, it is very difficult to test and adjust relays on the bay. Generally it is necessary to perform such operations as unsoldering and insulating certain relay contacts. Changes and adjustments so made take considerable time, thereby placing an important circuit out of service for a considerable period. However, with plug-in relays, a new relay may be substituted immediately for the defective or doubtful relay and there will be a minimum of interruption for the circuit. The present invention enables economical manufacture and easy assembly and adjustment.

Other objects, features and advantages will appear upon consideration of the following detailed description and of the drawings, in which Fig. 1 is an elevation of a plug-in relay assembly embodying the present invention, the relay being in upright position with the front wall broken away along the line 1—1 of Fig. 2;

Fig. 2 is a section taken along the line 2—2 of Fig. 1;

Fig. 3 is a section taken along the line 3—3 of Fig. 1, the socket and support being omitted;

Fig. 4 is a section taken along the line 4—4 of Fig. 1, the socket and support being omitted;

Fig. 5 is a fragmentary top plan view of the unitary central portion of the base of the relay;

Fig. 6 is a sectional view along the line 6—6 of Fig. 5;

Fig. 7 is a plan view of the support for these sockets;

Fig. 8 is a section on the line 8—8 of Fig. 7;

Fig. 9 is a bottom plan view of the assembled base of the relay unit;

Fig. 10 is a top plan view of a socket adapted to carry two relays;

Fig. 11 is a view taken along the line 9—9 of Fig. 10 looking in the direction of the arrows;

Fig. 12 is a fragmentary elevation taken along the line 10—10 of Fig. 11 looking in the direction of the arrows;

Fig. 13 is a fragmentary bottom view of the socket structure of Fig. 8; and

Fig. 14 is a perspective view of one of the spring contact members or jacks to receive the contact prong of the relay.

Referring to the drawings, Figs. 1, 2, 3, 4, 5, 6 and 9 illustrate a plug-in relay 15 comprising a core 16, a spool or coil 17 surrounding said core, and an L-shaped return pole piece 18 which is preferably of rectangular cross-section. The core 16 is of circular cross-section and has a screw-threaded reduced lower end 19 which passes through a corresponding opening in the base of said L-shaped pole piece 18 and into a nut 20 which when tightened clamps said core and pole piece firmly together. Below the nut 20, said threaded lower end passes through a bore in a magnet base 22 of insulating material, constituting an intermediate or body portion of base 23 of the relay. Said body portion 22 is countersunk at the upper end of said bore to receive the nut 20 and enable the central part of said body portion 22 to engage the base of said L-shaped pole piece 18, and is countersunk at the lower end of said bore to receive a nut 24 on said threaded lower end 19 of the core. By tightening said nut 24, the magnet base may be secured firmly to the pole piece 18 and the magnet core 16.

At the outer face of the upper end of the upright portion of the return pole piece 18 is an armature bearing plate 25 firmly attached to the pole piece as by spot welding. Said plate 25 may be somewhat wider than the pole piece 18 and at a level slightly above the top of the return pole piece may be cut away to provide an upright portion 26 of reduced width and two outwardly extending shoulders 27 with aligned horizontal bearing edges 28 at the outer face of said plant 25. Said bearing edges 28 provide a pivotal axis for an armature 29 illustrated as a plate having at one end projecting lugs 30 passing on opposite sides of said upright portion 26 of plate 25 and bent down intermediate their ends to form sharp obtuse-angle corners to cooperate with said bearing edges 28 which act as knife-edge bearings.

Preferably said lugs 30 project laterally beyond the sides of the main body of the armature which overlies and nearly covers the upper end of the magnet. Mounted on said armature just back of the lugs 30 is the middle portion of a sheet metal member 31 of U-shape of which the sides or arms 32 extend downwardly below the lower edge of plate 25 and are continued as arms 33 extending away from the magnet beneath the portions of plate 25 projecting beyond the sides of the return pole piece 18. A member 34, preferably round, is mounted, as by means of pivots 35A, in arms 33 and engages armature springs 35 which normally engage back contact springs 36 but are shiftable by the armature 29, upon energization of the magnet, into contact with the front contact springs 37. As illustrated, there are four sets of springs 35, 36 and 37. All of these springs are provided with suitable contact points.

The springs 35, 36 and 37 are secured in a manner to be described hereinafter in insulating material of the base 23 of the relay and project from the lower side thereof to provide plug-in terminals 38. Beneath the arms 33 and member 34 there is a frame 41 of insulating material, preferably rectangular, secured to the upright portion of the return pole piece 18 by suitable means such as a screw 43 passing through a lug 41a projecting downwardly from said frame and integral therewith, and threaded into said upright portion of the return pole piece 18. The side 44 of the frame 41 next to the return pole piece is provided with recesses 45 to receive springs 36 and constitutes a spring guide. In the same manner, the opposite side 46 of the frame has recesses or notches 47 to receive springs 37 and constitutes a spring guide.

At the opposite side of the magnet from springs 35, 36 and 37 are two parallel rows of four springs each fixed in insulating material of said base 23 in a manner to be described hereinafter, and projecting from the lower side thereof to provide plug-in terminals 38. The two inner springs 48 of the inner row are coil terminals projecting relatively short distances above the base and the inner springs 49 of the outer row are also coil terminals. The coil terminals are connected to insulated wires 49a of the magnet coil 17. The inner row also includes two end springs 50 which incline slightly away from the coil above the base 23 and although normally in contact with corresponding springs 51 of the outer row, preferably through suitable contact points, may be withdrawn therefrom upon energization of the relay magnet and consequent movement of the armature 29. To this end the armature 29 is provided with a central tongue 52 projecting to the right (Fig. 2) beyond the cap of the spool and over this tongue is placed, and secured as by welding, the flat base of a U-shaped member 53 of sheet metal of which the sides or arms 54 extend downwardly in parallel planes.

At their lower ends arms 54 are split to spring over reduced connections between a central section of an element 55 and end portions 56 which engage the outer faces of springs 50 above the upper ends of springs 51. Energization of the relay will therefore cause breaking of electrical connections between inner springs 50 and outer springs or back contacts 51.

The springs 35 and 50 urge said armature 29 upwardly and tend to produce an air gap between the upper end of the core 16 and a contact point 57 on the lower face of the armature. To limit and adjust said air gap, there may be secured to the upper surface of the armature as by welding, an air gap clip 58 in the form of a metal strip with its left portion lying flat on said armature and secured thereto as by welding and with a right portion inclined upwardly away from the upper part of pole piece 18. The clip 58 may be engaged by the rounded end of a screw 59 threaded through the upward projection 26 and locked in adjusted position by a lock nut 60. The action of the screw 59 on the inclined upper surface of the right portion of clip 58 enables accurate adjustment.

For the purposes of ready assembly and disassembly and for adjustment of the tensions of the leaf springs, the portion of said springs are arranged in lines between parts of the base including the central part 22 and are gripped therebetween. The springs are flat and where they pass through the base 23 are bent preferably in curves which may be arcs of circles connected to substantially straight lines by reverse curves, to hold them against longitudinal movement and also against turning. These parts of the flat springs rest in grooves having bottoms of substantially the same shapes as the wires and being formed in lateral faces of said members corresponding to the shapes of said wires. In the particular forms of the parts as disclosed, the bent portions of the springs or wires are pressed to the bottoms of said grooves by corresponding ridges on the corresponding faces of adjacent gripping members. Although flat springs are disclosed, springs of other cross sections such as round may be used. It should be understood that the edges of the parts gripping the wires have substantially the same shape in cross-section as the bottoms of the grooves.

The springs 36 are gripped against the left side (Fig. 1) of the base base member 22 by means of a member or bar 61, the springs 35 are gripped against the left side of member 61 by means of a member 62, and the springs 37 are gripped against the member 62 by means of an outside member 63. At the other side of the base member 22 the two springs 48 and the two springs 50 of the inner row are gripped against member 22 by a member 64 and the spring 49 and 51 are gripped against member 64 by a member 65. After all parts of the base are assembled in this way, spring clips 66 (Figs. 1, 3 and 4) are applied thereto at opposite sides of said base 23, being seated in grooves provided for that purpose.

The curved intermediate parts of the adjacent faces of members 22, 61, 62, 63, 64 and 65 may be considered as generated about horizontal axes parallel to said adjacent faces and to the top and the bottom of the base of part 22. The curved intermediate parts of the springs with reverse curves at the ends of said intermediate parts make it easy to support the springs against longitudinal displacement and against turning movements.

It will be evident that bent portions of the springs although formed with convex sides and with the opposite sides concave, need not be curved but may be made with successive straight line portions, the gripping surfaces being correspondingly shaped. In these cases the concave and convex surfaces of the parts may be considered as generated by lines moving parallel to fixed horizontal lines or axes. The parts of the spring-clamping surfaces of the insulating blocks or members at the base of the relay, above the concave and convex parts, are inclined at the proper angles to give a preliminary adjustment of the springs for either a make or break contact.

Not only is the construction of the base 23 of advantage in assembling the contact springs and coil terminals in said base, but it facilitates adjustment of the tensions of said springs, as will be explained more fully hereinafter.

In order to provide more secure holding of contact springs 36 against the left side of magnet base 22 (Fig. 1) and contact springs 50 and coil terminals 48 against the right side thereof, said magnet base is provided with an upwardly extending flange 67 (Fig. 6). The left side of magnet base 22 is provided with a groove 68 for each contact spring 36. Said groove 68 is of greater depth than the thickness of spring 36 and is narrowed from the mouth of the groove toward the bottom thereof, thus acting to seat the spring accurately as to lateral position and direction and otherwise facilitating the seating of the spring against the bottom of the groove 68. The groove 68 might be of triangular shape.

The bottom of each groove 68 has, at a part spaced from the lower face of said magnet base 22 by a strip 69 and from the upper face by a strip 70, a concave portion 71 curved in a circular cylindrical surface about a horizontal axis. The lower strip 69 is vertical but the upper strip extends upwardly and to the right so that the part of spring 36 above the base 22 will be inclined to the right and pressed against the spring guide 44. The left face of magnet base 22 has the same general contour as the bottom of each groove 68.

Corresponding to each groove 68 at the left of magnet base 22, there is at the right of member or bar 61 a rib 72 (Fig. 9) adapted to enter the groove and clamp the corresponding spring 36 therein. The edge of each rib 72 will have a vertical lower portion to cooperate with the vertical lower strip 69 (Fig. 6), a convexly curved intermediate portion to cooperate with the concavely curved strip 71, and an upper straight portion which determines the inclination of that part of the spring 36 within the limit determined by the part 70. Between the ribs 72 which are narrow enough to enter the grooves 68 there are grooves 73 (Fig. 9) wide enough to receive teeth 74 (Figs. 5 and 9) between the grooves 68.

As indicated in Fig. 1, the upper part of each groove at the left of bar 61 and the corresponding rib at the right of bar 62 are so positioned that springs 35 are urged to the right to contact at their upper ends with springs 36. The bars 62 and 63 are so shaped at their adjacent sides as to urge the upper ends of springs 37 to the left against the spring guide 46.

At the right of said magnet base 22, the edge thereof is similar in form to that at the left except that the intermediate portion is concave to the right and the upper end of the base of each groove is substantially vertical. There is no need in this case to provide any substantial inclination of the springs 50 above the base 23. They are, however, bent slightly away from the magnet to enable sufficient inward movement to break contact with springs 51. The springs 50 and coil terminals 48 are pressed into the grooves in magnet base 22 by ribs at the left of member or bar 64. The springs 51 and coil terminals 49 are similarly gripped between bar 64 and bar 65.

The assembled base 23 is provided with a ledge 80 extending around the upper part thereof and at the base of a rectangular top portion. This ledge may be used to support the open lower end of a cover or casing 81 which fits closely around said top portion and around the outer side and two ends of the frame 41. Said cover is provided at its top with an opening 82 to receive the upper end of the reduced extension 26 of the armature bearing plate 25, and a tubular extension 83 which extends to the upper end of said extension 26 and is open at the top.

The upper end of extension 26 is provided with an opening 84 therethrough in alignment with openings 85 in opposite walls of said tubular extension 83. The cover 81 may be secured in position over the relay by inserting a bolt 86 through the openings 85 and the opening 84 with its head against one side of the tubular extension 83. At the other side of said extension 83, the shank of said bolt is provided with a groove to receive the split end of a clip 87 in the form of a thin plate having a part extending horizontally over the top of the adjacent side of said tubular extension. In this manner each relay may be made substantially dust-proof.

Of course the relay as hereinbefore described might be supported in any suitable way and all of the terminals projecting downwardly from the base might be connected to suitable conductors. However, it is very important to be able to remove a relay and also to apply one readily. To this end it is important to have a socket structure into which the terminals at the base of the relay may be inserted. It is also important to provide socket assemblies which are economical to manufacture, assemble and install and in which parts of the socket structure may readily be removed or applied without interference with other parts.

The ends of the springs projecting from the lower face of base 23 of the relay constitute plug-in terminals 38. A suitable relay socket 88 comprising a plate or block 89 is best shown in Figs. 8 through 12. This socket is adapted to accommodate two relays 15. It should be understood, however, that the socket might be small enough to accommodate only one relay or large enough to accommodate more than two relays. Each relay may be properly positioned on the socket by inserting into a suitable opening 90 in the socket a member 91 projecting downwardly from the base of the relay. Said member 91 may have a round body portion with a rib 93 adapted to engage a groove in opening 90 to insure positioning of the relay.

The body 89 of the socket 88 may be in the form of a plate or block of suitable material such as molded plastic with a central longitudinally extending groove 94 therein at its rear face. At the left of said groove 94, said block is provided with three rows of passages or openings 95 corresponding to the plug-in terminals projecting downwardly from base 23 at the left of Fig. 1. At the right of said groove there are two rows of passages 95 corresponding to the plug-in terminals at the right of Fig. 1. Said passages 95 are designed to receive socket springs or jacks 96.

Each socket spring 96 is formed of a metal strip of resilient character and of substantially uniform width throughout its length. Said socket spring has two arms 97 diverging from a fold or bend thereof and toward their outer ends these arms are turned outwardly at right angles to provide shoulder portions or shoulders 98 (Fig. 14). At the outer ends of these shoulders the arms are turned through right angles into parallelism with the main portions of said arms. The arms are then turned inwardly and outwardly so that provision is made of inwardly convex portions 99 adapted to engage each other when the parts at opposite sides of the bend are pressed together and to receive therebetween a contact terminal 38 of the relay.

Each of said passages 95 is provided with an upper part of generally rectangular cross-section to receive the upper part of a socket spring and a reduced lower part just sufficient in cross-section to receive the folded together parts at opposite sides of the bend or fold. When the outer ends of said arms of a socket spring are pressed together the device may be inserted into an opening 95 until shoulders 98 engage shoulders 100 formed at the inner end of the reduced portion of the passage. At proper points the arms 97 are provided at their edges with barbs 101, each of which is formed by suitable cutting at the edge of an arm 97 and displacement of the end of the part so cut, out of the plane of the arm. These barbs 101 will be forced back in inserting the socket spring and will then snap into position at the lower face of the block 89 and prevent outward movement. The holding action of the barbs is illustrated in Figs. 11, 12 and 13. The holding by said barbs is so effective that a socket spring might be divided at the bend into two parts. These two parts could be inserted together and would be firmly held.

Adjacent the bend thereof each socket spring 96 is provided with aligned openings 102 for convenience in connecting a wire to said spring. At the bottom faces thereof, both relay base 23 and socket body 89 may be provided with suitable indications including numbers to assure the making of connections to the proper wires. As disclosed, each socket 88 is designed to carry two relays 15 across the ends of said groove 94 but at the opposite face of block 89.

Each socket body or block 89 is cut out at its rear face and across the end portions at opposite sides of said grooves 94 to provide shoulders 103 (Fig. 12) to rest against the edges of parallel metal sides 104 (Figs. 7 and 8) of a support 105 (Fig. 11) for a plurality of said socket blocks 89, and to enable the part of the block to the rear of such shoulders to fit between said sides 104. Joining the outer edges of said sides 104 are cross members 106 integral therewith and in the form of inverted channels comprising inturned flanges 107 and of a size for the grooved portions of socket bodies 89 to be placed thereover (Fig. 11). As illustrated, the cross members 106 which correspond to rungs of a ladder project outwardly beyond the edges of the parallel sides 104. Each block 89 is secured to the corresponding cross member 106 in a suitable member as by screws 108 passing through openings in the base of the cross member and into openings 109 in the socket body 89. The screws 108 may be of the self-threading type. The cross members 106 are spaced to assure sufficient clearance between blocks 89 on two successive cross members.

As indicated on Fig. 7, the relays 15 mounted on each cross member 106 are separated and due to this separation, and to the covers 81 there should be no interference between the magnetic circuits of the relays.

Although the relay disclosed is of the break before make type, the invention may also apply to a relay of the make before break type but in this modified form the arrangement at the right of Fig. 1 would be changed so that each time the coil 17 is energized there would be contact breaks.

The relays are shown as associated in groups of two on each socket body 89, but the arrangement may be modified to apply to one relay or to more than two relays on each socket body or base 89.

The arrangement of the relay with sets of conductor springs secured in the base at opposite sides of the relay makes it possible to limit the width of the relay so that said width is only slightly greater than the diameter of the head of the spool of the magnet. Said base is held at both ends to the socket member and across the groove 94 at the rear face of the socket block 89, by the two groups of plug-in terminals, and neither of said ends is likely to work away from said socket block.

The location of cross members 106 in grooves 94 of socket blocks assists in positioning the bases of the relay and holding them against movement transverse to said cross members. The projection of a portion of each socket block between the sides 104 of the support serves to position the blocks in directions transverse to said sides 104 and longitudinally with respect to said cross members. The engagement of said shoulders 103 with the edges of sides 104 acts to prevent any rocking movement of the socket blocks 89 on cross members 106.

Although the conductor springs are disclosed as pre-shaped where they pass through the relay base, there may be instances where the bends in the springs are produced by subjecting the springs to pressure between the bars or parts of the relay base.

The socket bodies 89 are readily molded from suitable insulating material and upon forcing the socket springs 96 into said passages 95, the sockets will be ready for use. Each support 105 may readily be formed from a metal strip by cutting and bending.

It should be understood that various changes may be made and that certain features may be used without others without departing from the true scope and spirit of the invention.

What I claim is:

1. A plug-in relay comprising a magnet, an insulating base carrying said magnet, sets of springs including contact springs secured in said base projecting from said base as plug-in terminals, said springs being bent at portions intermediate the surfaces of said base but being straight at the ends of said bent portions, said base comprising a magnet base for supporting said magnet and bars parallel to the adjacent side of the magnet base, said magnet base and bars receiving said springs in rows therebetween and having spring engaging surfaces fitting against said bent portions of the springs, and said magnet base and bars being locked together by suitable means.

2. In a plug-in relay, a plurality of conductor springs arranged in parallel and having portions similarly bent so as to be convex at one side and concave at the other, but having straight portions above and below said bent portions, and a base comprising parallel bars having respective convex and concave surfaces operatively positioned to engage opposite sides of said bent portions and to determine the direction of emergence of each of said springs, the portions of each spring between said bars and adjacent the point of emergence being held displaced from its normal position, and means for clamping said bars together.

3. The combination according to claim 2 wherein said bent portions are in the form of circular arcs.

4. The combination according to claim 2 wherein said bent portions are in the form of circular arcs and certain edges of said bars have grooves in which springs are positioned.

5. The combination according to claim 2 wherein said bent portions are completely received in grooves in one of two adjacent surfaces, and the adjacent surface of another bar is provided with ridges to enter said grooves and press the springs against the bottoms thereof.

6. In a device of the character described, a plurality of conductor springs arranged in parallel, a base comprising parallel bars engaging each of said springs on opposite sides and means for clamping said bars together with said springs therebetween, the portions of the various springs of each row between the upper and lower faces of said base being bent in the same way intermediate the ends of said portions and in planes perpendicular to said bars, and the adjacent edges of said bars having spring-engaging surfaces fitting against the bent portions of said springs.

7. In a device of the character described, the combination, as claimed in claim 6, in which said springs are arranged in rows parallel to said bars, each row of springs being supported between two adjacent bars.

GERALD DEAKIN.

REFERENCES CITED

The following references are of record in the file of this patent:

UNITED STATES PATENTS

| Number | Name | Date |
|---|---|---|
| 1,151,497 | Reinke | Aug. 24, 1915 |
| 1,553,314 | Goff | Sept. 15, 1925 |
| 2,069,171 | Merkel | Jan. 26, 1937 |
| 2,096,962 | Dressel | Oct. 26, 1937 |
| 2,124,182 | Braun | July 19, 1938 |
| 2,134,945 | Howe | Nov. 1, 1938 |
| 2,135,832 | Obergfell | Nov. 8, 1938 |
| 2,160,056 | Brandt | May 30, 1939 |
| 2,198,704 | Lazich | Apr. 30, 1940 |
| 2,209,214 | Wallace | July 23, 1940 |
| 2,241,838 | Wilson | May 13, 1941 |
| 2,258,122 | Merkel | Oct. 7, 1941 |
| 2,268,261 | Merkel | Dec. 30, 1941 |
| 2,279,395 | Gardiner | Apr. 14, 1942 |
| 2,383,909 | Buchanan | Aug. 28, 1945 |
| 2,405,554 | Barbour, Jr. | Aug. 13, 1946 |
| 2,409,054 | McBerty | Oct. 8, 1946 |

FOREIGN PATENTS

| Number | Country | Date |
|---|---|---|
| 275,225 | Great Britain | Nov. 3, 1927 |